INVENTORS J. M. FRASER
N. G. LONG
BY R. O. Nimz
ATTORNEY

United States Patent Office
3,466,398
Patented Sept. 9, 1969

3,466,398

AUTOMATIC LOAD ADJUSTMENT FOR TIME ASSIGNMENT SPEECH INTERPOLATION SYSTEMS

John M. Fraser, Whippany, and Norwood G. Long, Millington, N.J., assignors to Bell Telephone Laboratories, Incorporated, Murray Hill and Berkeley Heights, N.J., a corporation of New York Filed July 1, 1966, Ser. No. 562,394
Int. Cl. H04j 1/00; H04l 5/00
U.S. Cl. 179—15 9 Claims

ABSTRACT OF THE DISCLOSURE

A Time Assignment Speech Interpolation (TASI) system is disclosed in which the quality of speech being transmitted, as measured by the freezeout ratio, is monitored and the number of input lines is adjusted so as to maintain the freezeout ratio constant thereby increasing the number of input lines that may be served.

This invention relates to multichannel communication systems and, more particularly, to automatically adjusting, load-balancing line switching circuits for use with such systems.

In communication systems using long and expensive transmission facilities, such as transoceanic submarine cables and satellite communication systems, terminal facilities which insure optimum utilization of the transmission channels are very important. For the transmission of speech, one particularly useful system is the Time Assignment Speech Interpolation (TASI) system disclosed in A. R. Kolding et al. Patent No. 2,957,946, granted Oct. 25, 1960. This system takes advantage of the statistical fact that a telephone conversation, on the average, uses the transmission channel in one direction for less than one-half of the time By connecting a talker to a channel only when speech is actually present, and at other times connecting the channel to other active talkers, large savings in channel time may be effected.

The limit on the number of trunks which can be served by a transmission facility equipped with TASI switching equipment depends directly on the quality of speech required. It will be apparent that, whenever a number of talkers greater than the number of transmission channels simultaneously begin speaking, a certain number of these talkers will be temporarily denied service or "frozen out" of the transmission facilities. Such "freeze-outs" cause a loss of some speech fragments, and hence degrade service.

Heretofore proposed TASI systems have been constructed so as to minimize this degradation by fixing the ratio of talkers to channels at some preferred ratio. This ratio, of course, is chosen with the view of providing acceptable service even at those times when talker activity increases to some standard deviation from the average. As a result, a good portion of the time the system is operating substantially below its capabilities. In addition, on those few occasions when the talker activity exceeds this standard deviation, the quality of service is degraded below that found to be the most desirable.

It is an object of the present invention to improve the quality of speech transmitted by way of a time assignment speech interpolation system.

It is another object of the invention to increase the number of telephone trunks which may be connected to a fixed number of transmission channels by way of a time assignment of speech interpolation system.

It is a more specific object of the invention to maintain constant the quality of speech transmitted by way of a time assignment speech interpolation system.

It is yet another object of the invention to maintain a constant ratio between the number of active talkers "frozen-out" of a time assignment speech interpolation system and the total number of active talkers.

In accordance with the present invention, these and other objects are achieved by constantly monitoring the "freezeout fraction," i.e., the ratio of the number of talkers instantaneously frozen-out to the total number of active talkers. Automatic trunk switching means are provided to increase or decrease the number of trunks having access to the TASI system in response to variations in the freezeout fraction above or below the desired level. In this connection, it will be recognized that the freezeout fraction is the only valid criteria of quality of service provided by the TASI system.

By continually adjusting the ratio of trunks to channels in response to changes in the current speech activity, not only is the quality of speech continually maintained, but the average ratio is increased substantially. In the heretofore proposed TASI systems, for example, a one-hundred channel transmission system can handle the speech on about 235 telephone trunks. During an average busy hour, the system of the present invention continually adjusts the ratio of talkers to channels by providing service for between 214 and 300 trunks. In this case the average number of trunks serviced during the hour is 252. Moreover, during periods of less activity, even greater loads can be handled. These greater loads are handled, moreover, with no loss of speech quality and, indeed, in many cases, with an increase in speech quality.

In connection with the present invention, it should be noted that changes in the trunk loading of a TASI system are effected by artificially busying out trunk appearances and then removing this artificial busy condition, and are not achieved by interrupting service on any trunk.

These and other objects and features, the nature of the present invention and its various advantages, will be more readily understood upon consideration of the attached drawings and of the following detailed description of the drawings.

In the drawings:

FIG. 1 is a general schematic block diagram of one terminal of a time assignment speech interpolation system using controlled loading in accordance with the present invention;

FIGS. 2A and 2B, taken together, comprise a more detailed block diagram of the transmitting switch of a time assignment speech interpolation system modified in accordance with the present invention;

Several of the figures of these drawings utilize the so-called "detached contact" convention in which no attempt is made to associate the contacts of a relay with the relay structure which operates those contacts. Contacts associated with a particular relay winding are identified by the same alphanumeric mnemonic. This convention is described by F. T. Meyers in "An Improved Detached-Contact Type of Schematic Circuit Drawing," Communications and Electronics, No. 20, pages 505–513, September 1955.

Figure 1:
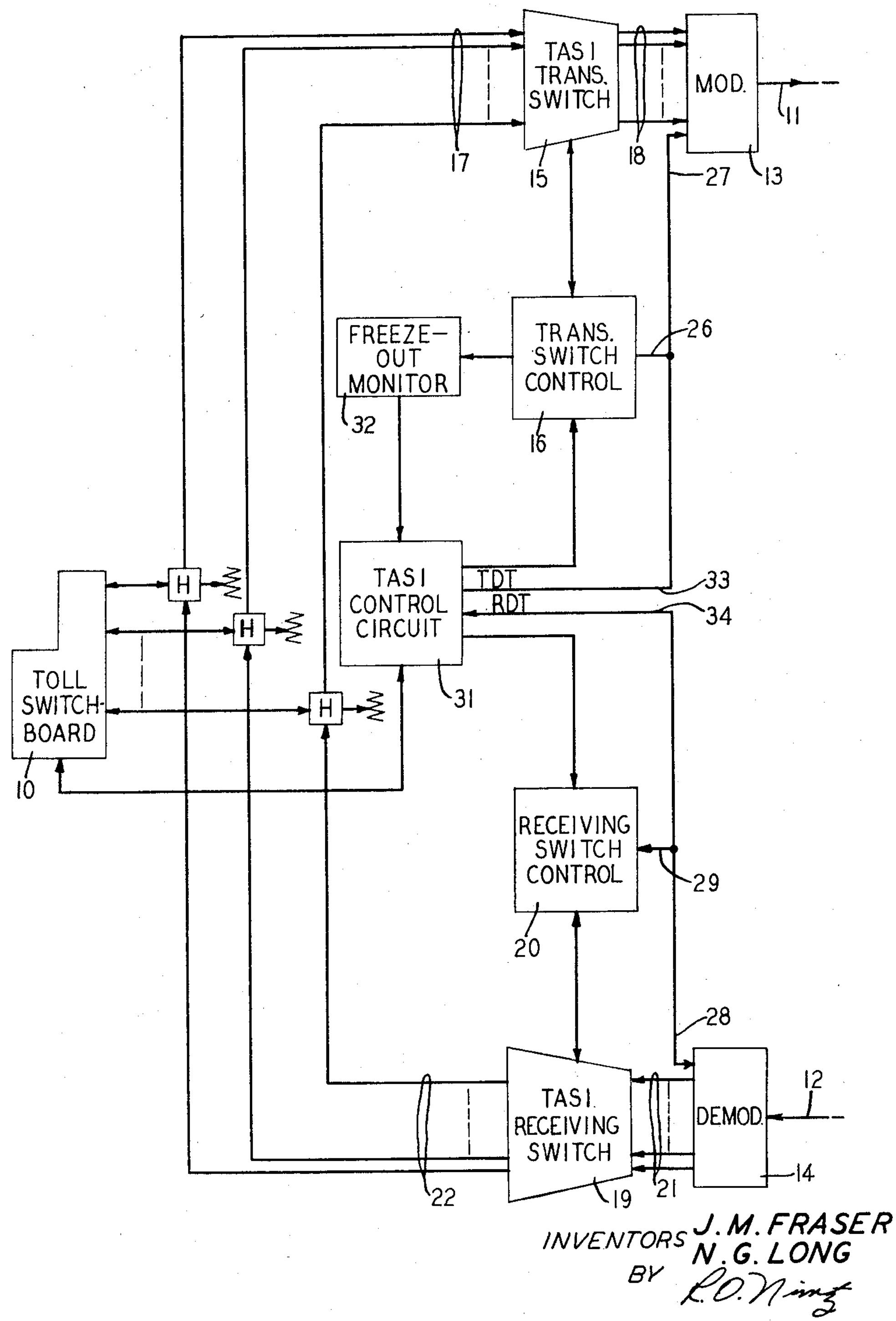

Referring more particularly to FIG. 1, there is shown a schematic block diagram of one terminal of a multichannel communication system employing time assignment speech interpolation. In general, the system of the present invention serves to connect a plurality of telephone trunks terminating in a toll switchboard 10 to an equal plurality of remote telephone trunks through two one way multichannel transmission facilities 11 and 12. Transmission facilities 11 and 12 may comprise, for example, transoceanic telephone cables, one for each direction, or satellite microwave radio links. By means of modulating equipment 13, a large number of telephone transmission channels may be carried by the single facility 11 to the remote location, possibly on another continent. Similarly, transmission channels from the remote location, carried by transmission facility 12, are separated by local demodulating equipment 14.

The function of the TASI facilities in the above-described communication system is to allow the transmission facilities 11 and 12 to carry the speech derived from a far larger number of telephone trunks. In a communication system providing thirty-six transmission channels, for example, about seventy simultaneous telephone conversations arriving over separate telephone trunks may be transmitted without significant interference. This is possible due to the large proportion of silent periods during an average telephone conversation. Pauses between sentences, words, and even syllables, as well as pauses while the other party is talking, may be made use of for the transmission of speech fragments from a different talker to a different listener. Less than one-half of the total conversation time is required to transmit the actual speech signals and hence more than two times as many talkers can be accommodated on a transmission facility by utilizing speech interpolation techniques.

In order to interpolate speech on a time division basis, it is necessary to be able to connect any talker trunk to any transmission channel for at least the period of time required to transmit a speech fragment. TASI transmitting switch 15 is just such a facility. Transmitting switch 15, under the control of switch control circuit 16, can connect any one of a large number of telephone transmitting trunks 17 to the input of any one of a lesser number of transmission channels 18. Similarly, TASI receiving switch 19, under the control of switch control circuit 20, can connect the output of any one of a number of transmission channels 21 to any one of a far larger number of telephone receiving trunks 22. The details of one type of TASI switch and control circuit is disclosed in A. R. Kolding et al. Patent 2,957,946 granted Oct. 25, 1960, to which the reader is referred for these details.

As disclosed in this patent, each telephone transmitting trunk 17 is monitored by a speech detector which indicates when a connected telephone trunk is actually carrying speech. These speech activity signals are supplied to transmission switch control circuit 16 to allow control circuit 16 to connect each active trunk to an available transmission channel. Since these connections are continuously changing, however, a control lead 26 from the switch control circuit 16 is connected to an auxiliary control channel 27. Control lead 26 carries much of the information concerning the switching conditions which is necessary at the remote receiving terminal to duplicate these connections and thus allow the receiver to connect each local talker to the appropriate remote listener.

At the bottom of FIG. 1, a corresponding control channel 28 is connected by way of control lead 29 to the receiving switch control circuit 20. In this way, receiving switch control circuit 20 receives the connection information from the remote transmitting terminal and uses this information to duplicate locally the trunk-channel connections at the remote transmitter and hence connect each remote talker to the appropriate local listener. Control channels 27 and 28 may be combined with the speech channels on facilities 11 and 12, as shown, or may comprise entirely separate transmission lines. In either event, it is apparent that the control channels must have a high degree of dependability and preferably each should have an alternate standby facility which can continue the control function in case of failure.

It will be noted that TASI transmitting and TASI receiving facilities comprise essentially separate and distinct transmission systems. The TASI transmitting switch 15 sets up connections in response to the activity of local talkers and these connections are duplicated at the remote TASI receiving facilities, not shown. Similarly, a remote transmitting switch, not shown, sets up connections in response to the activity of remote talkers and these connections are duplicated in the local receiving switch 19. Transmitting facility 11 carries interpolated speech in one direction and transmission facility 12 carries interpolated speech in reverse direction. These transmissions and the associated switching functions are not synchronized and, indeed, have no correspondence other than the identification of each talker and listener pair with particular transmitting and receiving trunks. Speech transmitted in one direction between such a pair, for example, need not occupy a channel or a time period corresponding to that occupied by speech transmitted in the other direction between the same pair.

In accordance with the present invention, means are also provided for selectively providing access to the TASI facilities from a conventional telephone plant. The TASI control circuit 31 is provided for this essential function. In order to understand the operation of the TASI control circuit of this invention, it is convenient to outline the operation of previous TASI systems.

It is known that the transmission facilities 11 and 12 would be statistically capable of carrying a preselected maximum number of telephone conversations with a prescribed degree of fidelity. This preselected number, divided by a number of transmitting channels 18 or 19, is referred to as "the TASI advantage." Heretofore proposed TASI systems have attempted to maintain this TASI advantage at a fixed value in the face of failures in one or more of the transmission channels. In order to do so, it was necessary to remove telephone trunks in direct proportion to the loss of transmission channels. Since this preselected ratio was based on statistical behavior of average talkers, occasions could arise when, due to variation from these average statistics, the quality of service might decline below the desired level. Moreover, at other times, the TASI system operates considerably below the point where any effect on speech can be detected and provides transmission paths for far fewer telephone trunks than it is capable of.

In accordance with the present invention, the ratio of telephone trunks to transmission channels is continuously varied in response to the actual quality of transmitted speech. In this way, the optimum number of telephone trunks is continuously provided with service although this number varies with the instantaneous statistics of the talkers as well as the availability of transmission channels.

A convenient measure of the quality of transmitted speech is the so-called "freezeout fraction." This figure is proportional to the ratio of the duration of lost speech fragments to the duration of speech, and is most desirably in the range of about 0.5 percent. To this end, a freezeout monitor 32 is provided to monitor the freezeout fraction involved in the operation of the transmitting switch 15. This freezeout fraction is supplied to TASI control circuit 31 which, in turn, controls the number of telephone trunks at toll switchboard 10 which have access to the TASI facilities. In this way, the average number of trunks served by the transmission facilities 11 and 12 is made substantially higher than when the trunk-channel ratio is maintained constant. Moreover, statistical variations in talker activity, as well as partial failure in the transmission facilities, are automatically compensated for by the same control circuit.

Since the number of trunks having access to the TASI facilities must be balanced for both transmitting and receiving, TASI control circuit 31 generates a Transmit Decrease Trunk (TDT) signal on lead 33 which is transmitted, by way of control channel 27, to the remote receiving terminal. Similarly, the remote transmitting terminal transmits a similar signal to the TASI control circuit 31 on lead 34, by way of control channel 38. This Receive Decrease Trunk (RDT) signal is utilized to reduce the number of trunks having access to the local TASI transmitting facility. It can be seen that the TASI control circuit 31 responds simultaneously to the quality of speech being transmitted through the local transmitting switch 15 as well as the quality of speech being transmitted through the remote transmitting switch, not shown. In the preferred embodiment, trunks are denied access to the TASI facilities by the simple expedient of marking these trunk terminals busy at the toll switchboard 10.

Figure 2A:
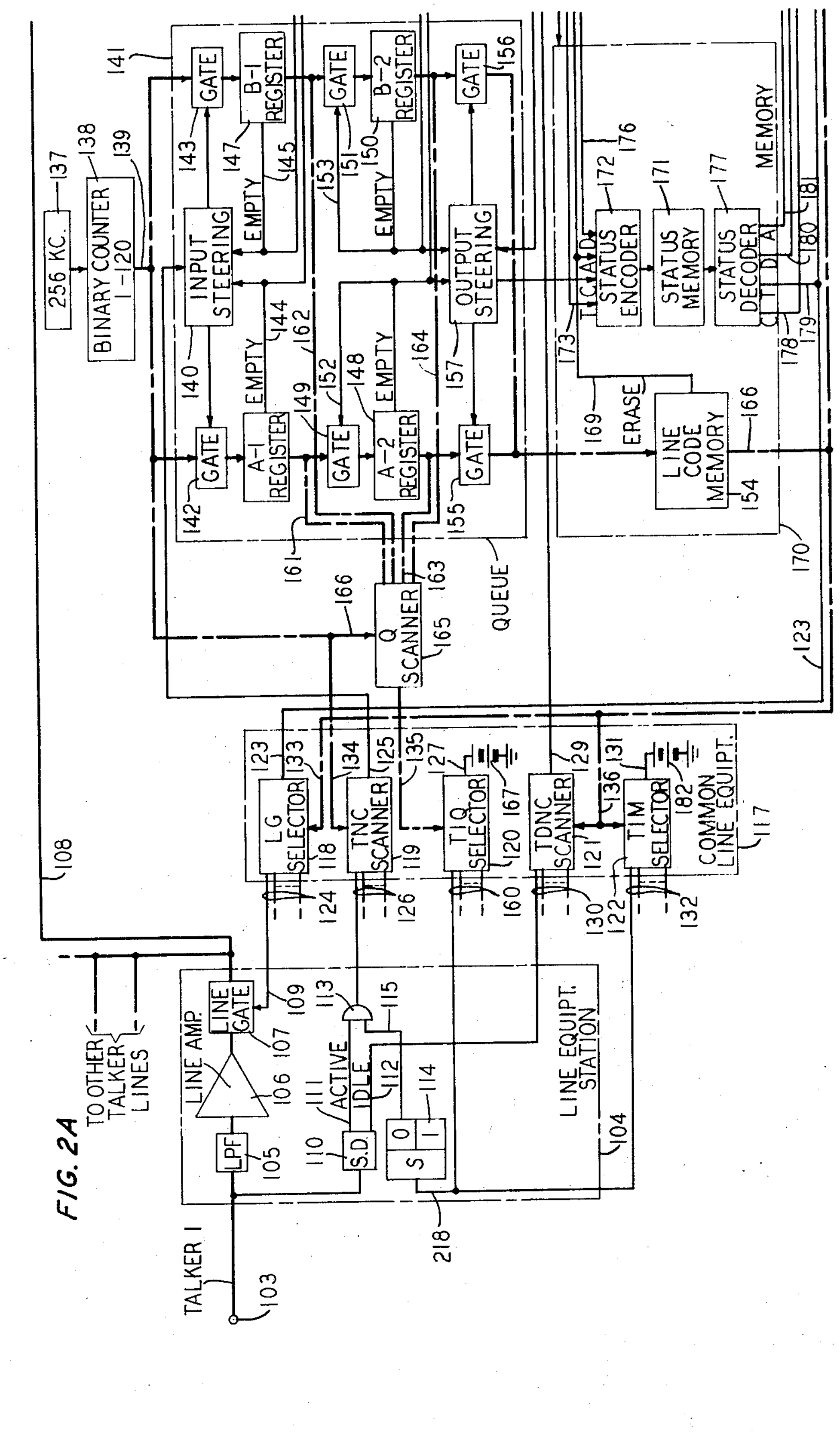
Figure 2B:
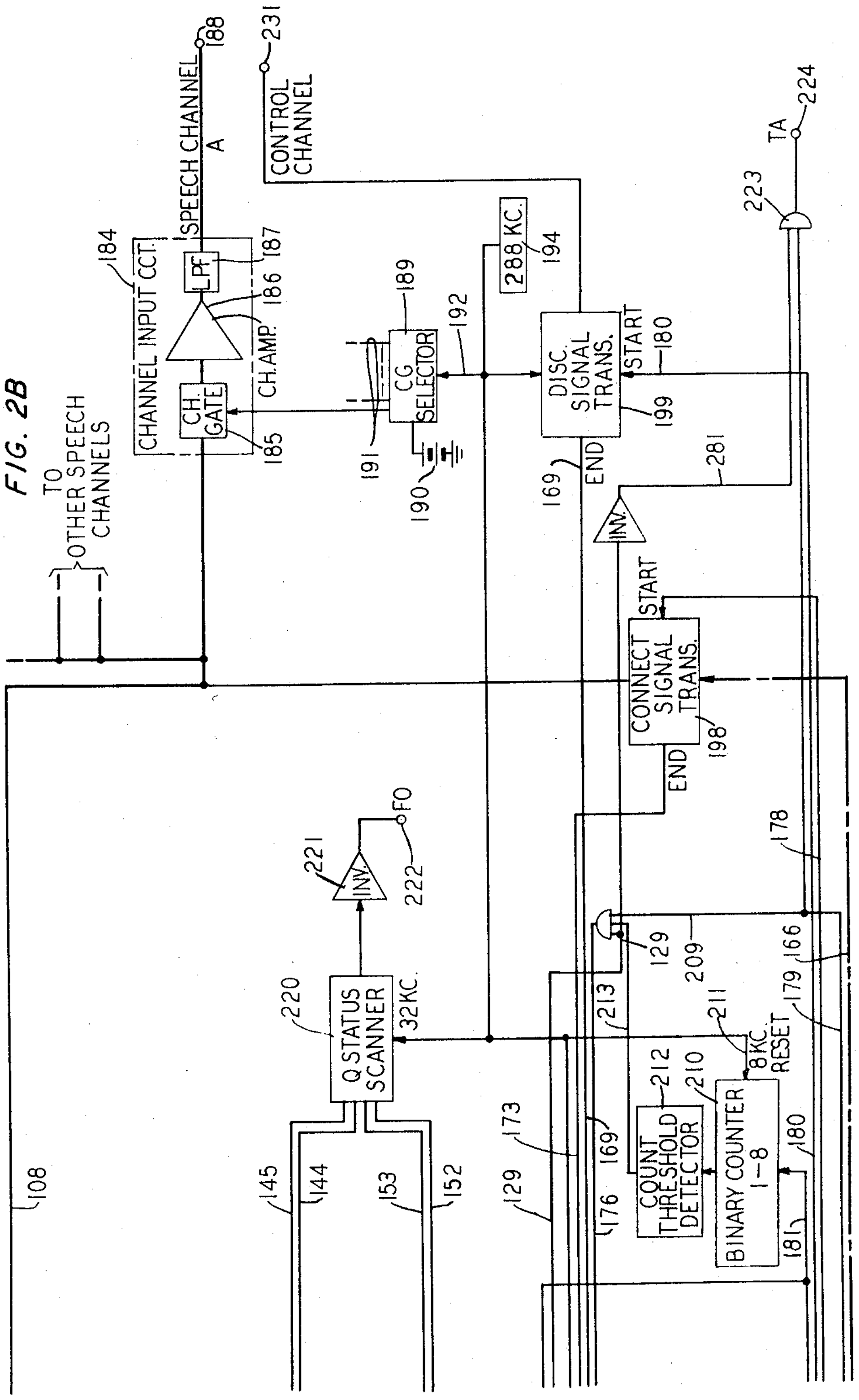

Referring more particularly to FIGS. 2A and 2B, there is shown a detailed block diagram of a portion of the transmitting switch 15 shown as a block in FIG. 1. The details for this transmitting switch are substantially identical to those disclosed in the aforementioned patent of A. R. Kolding et al., the only difference being the addition of the circuitry necessary to generate the freezeout information required by control circuit 31.

In FIG. 2A then a plurality of input terminals are provided for connecting signal sources to the TASI transmitter. For the purpose of convenience only one of these input terminals, terminal 103 has been illustrated. Connected to each of these input terminals is a line equipment station such as station 104 illustrated as being connected to input terminal 103. Line equipment station 104 includes all of the per line equipment required for the TASI transmitting switch. It includes a filter, an amplifier speech detectors and logic, as well as a time division gate, and is described in detail in the Kolding et al. patent.

There is also shown in FIG. 2A common line equipment 117 which includes a bank of selectors and scanners controlled by binary codes to selectively connect an identified one of a plurality of addressed terminals to the same common terminal. These are used for selectively operating the line gates, scanning the speech detector outputs, and similar operations.

The TASI transmission switch is driven by a clock generator 137 which advances a binary counter 138. The output of counter 138 serves to identify, in succession, the talker input lines connected to the TASI terminals. Under control of these codes, the activity of the various lines is scanned and, when an active line is detected, the corresponding code is gated into queue register 141. Queue register 141 serves to form a queue of talker line identifications for those requiring service and maintains this queue until channels are made available to the corresponding talkers. These codes are then supplied to a memory circuit 170 which continuously maintains a record of the current assignment of active talkers to idle transmission channels. These assignments are used to effect the actual connections over time division line 108. As described in the aforementioned Kolding et al. patent, these assignments are from time to time changed in response to the varying pattern of speech activity. Finally, the current assignment of talkers to channels are transmitted to the remote TASI facility by way of a connect signal transmitter 198 and disconnect signal transmitter 199 (FIG. 2B).

Also shown in FIG. 2B is an illustrative transmission channel 188 connected to a channel input circuit 184. There is, of course, one such channel input circuit for each of the transmission channels 18 in FIG. 1. This channel input circuit includes a filter, amplifier and the time division channel gate required to make connections to the common bus 108. By synchronizing the operation of the line gates and channel gate, samples of speech can be delivered from any one of the talker lines to any one of the transmitter channels, and if these samples are repeated at a sufficiently rapid rate, the speech signal can be faithfully reproduced by means of a low-pass filter.

In accordance with the present invention, means are also provided in the transmitting switch of FIGS. 2A and 2B to determine the quality of the speech currently being transmitted by the transmitting switch. As previously noted, this quality is accurately represented by the freezeout fraction, i.e., the ratio of talkers requiring service, but who have not as yet received such service, to the total number of active talkers. To this end, a scanning circuit 220 is provided to scan the status of the various registers within queue register 141 (FIG. 2A). These status signals appearing on leads 144, 145, 152 and 153, indicate when a talker code is not currently stored in the corresponding stage of the queue register. Since this queue register holds the codes of active but not yet assigned talkers, the output of scanner 220 is a bit stream the density of which is inversely proportional to the number of talkers frozen out. This bit stream is inverted in inversion circuit 221 and is supplied to terminal 222. Thus the density of the bit stream at terminal 222 is directly proportional to the number of active talkers not yet receiving service, i.e., frozen-out.

The total number of talkers actually receiving service are talkers who are currently assigned transmitting channels in memory 170. The status memory 171 within memory 170 as discussed in the Kolding et al. patent, maintains a record of the status of such assignments. These status signals, appearing on leads 178, 179, 180 and 181, indicate, respectively, that a new talker-channel assignment is being set up; that a talker-channel assignment is being used; that a talker-channel assignment is being discontinued; that a talker-channel assignment does not exist for that channel. Since the number of assignments in use, together with the inverse of the assignments not being used for speech, represent the total number of active talkers receiving service, leads 179 and 281 are connected to a logical AND gate 223, the output of which is supplied to terminal 224. The output at terminal 224 therefore comprises a bit stream the density of which is directly proportional to the number of talkers currently active. In accordance with the present invention, the ratio of the density of the bit streams at terminals 222 and 224 is substantially proportional to the freezeout fraction and hence represents the quality of service being provided by the TASI transmitting switch. Further details of the operation of the transmitting switch of FIGS. 2A and 2B can be obtained from the detail description in the aforementioned patent of A. R. Kolding et al.

Figure 3:
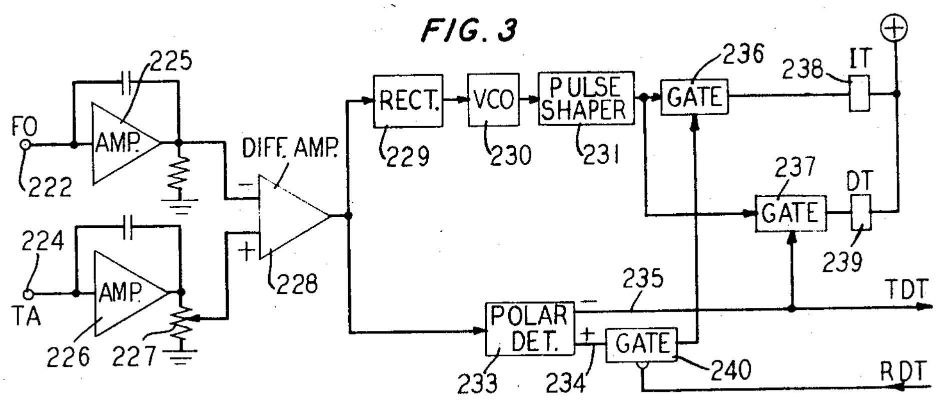
FIG. 3 is a more detailed block diagram of a monitoring circuit for monitoring the freezeout level.

Referring then to FIG. 3, there is shown a detailed block diagram of the freezeout monitor 32 of FIG. 1. In general, the circuit of FIG. 3 utilizes the pulse streams available at terminals 222 and 224 (FIG. 2B) to generate signals indicating the necessity for an increase or decrease in the number of trunks having access to the TASI facilities. In FIG. 3, the terminals labeled 222 and 224 correspond, respectively, to the similarly numbered terminals in FIG. 2B. The pulse streams appearing at these terminals represent the basic data required to compute the freezeout fraction.

Terminals 222 and 224 are connected to operational amplifiers 225 and 226, respectively, which are arranged as integrator circuits, and provide at their outputs direct current voltages proportional to the density of the input pulse streams. The output of amplifier 225 therefore is proportional to the number of active talkers which are frozen out of the TASI facilities, i.e., their speech is clipped. The output of amplifier 226, on the other hand, is substantially proportional to the total number of active talkers. It will be noted, however, that the input pulse stream to terminal 224 represents only those active talkers who are actually receiving service. Since the number of active talkers not receiving service is maintained at a very small percentage of the total number of active talkers, the approximation afforded by the input to terminal 224 is an entirely adequate representation of all active talkers.

If it is assumed that the desired freezeout fraction is some preselected value (.005 for example), then the voltage divider 227 can be arranged to attenuate the speech activity signal at the output of amplifier 226 by this amount. Under this condition, the outputs of amplifiers 225 and 226 are exactly equal when the freezeout fraction is at the desired level. These outputs are applied to differential amplifier 228, the output of which is used as a control signal to control the number of trunks having access to the TASI facilities.

To this end, the output of differential amplifier 228 is applied to rectifier 229 which, in turn, is used to control the frequency of a variable frequency, voltage controlled oscillator 230. The output of oscillator 230, in turn, is applied to a pulse shaping circuit 231 which provides pulses at a rate which is proportional to the absolute magnitude of the output voltage from differential amplifier 228.

The output of differential amplifier 228 is also applied to a polarity detector 233 which provides an output on lead 234 when its input is positive and an output on lead 235 when its input is negative. It can be seen that the output of differential amplifier 228 is monitored both as to magnitude and as to polarity. Positive outputs are used to increase the number of trunks having access to the TASI facilities while negative outputs are used to decrease this number. Moreover, the rate at which trunks are increased or decreased is made proportional to the absolute magnitude of the output from differential amplifier 228. In this way, large deviations from the desired freezeout level cause rapid changes in the number of trunks having access. Smaller changes, on the other hand, representing a less serious condition, allow trunks to be increased or decreased at a smaller rate.

Gating circuits 236 and 237 are connected to the output of pulse shaper 231. The output of gates 236 and 237 are respectively connected to Increase Trunks (IT) relay 238 and Decrease Trunks (DT) relay 239. The positive output from polarity detector 233 on lead 234 is applied by way of inhibiting gate 240 to enable gate 236 and allows the application of pulses to IT relay 238. The negative output of polarity detector 233 on lead 235 is applied to enable gate 237 and allows the application of pulses to DT relay 239.

The output on lead 235 also provides the TDT output identified by reference numeral 33 in FIG. 1. The inhibit input to inhibit gate 240 corresponds to the RDT lead identified by reference numeral 34 in FIG. 1. The purpose of transmitting the decrease trunk signal to the remote terminal is to prevent that terminal from increasing trunks at the same time that the local terminal is attempting to decrease trunks. The TDT signal generated at the remote terminal becomes the RDT signal at the local terminal and is used to inhibit the increase of trunks by way of inhibit gate 240.

If it is desired to introduce some hysteresis in the operation of the freezeout monitor of FIG. 3, the polarity detector 233 may be arranged such that outputs are produced on output leads 234 and 235 only after the input to polarity detector 233 has deviated from zero by some preselected small amount. This hysteresis allows minor fluctuations to take place in the freezeout fraction without taking action.

Figure 4:
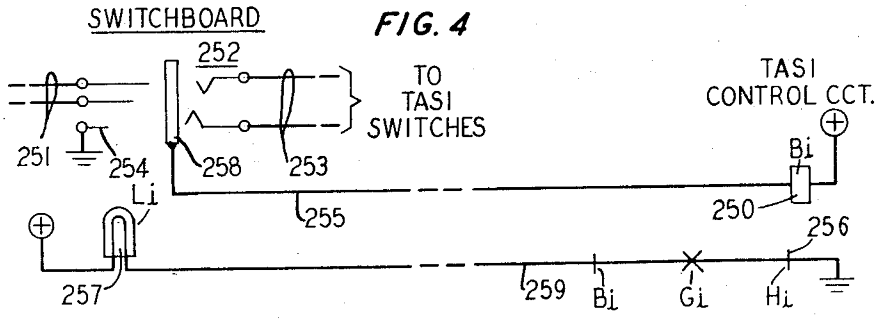
FIG. 4 is a detailed schematic diagram of the control circuitry for one trunk appearance in the system of FIG. 1.

In FIG. 4 there is shown a schematic diagram of a typical trunk appearance at the toll switchboard 10 of FIG. 1. Only one such position is shown since all are substantially identical. As can be seen, a busy relay 250 is operated by the insertion of an incoming telephone trunk plug 251 into station jack 252 at the toll switchboard. The insertion of this trunk plug into the station jack 252 connects the spring contact 254 to sleeve 258 and thereby operates busy relay 250. The operation of any one of the busy relays corresponding to relay 250 indicates that the corresponding incoming trunk is connected to the associated TASI trunk at the toll switchboard. Operation of Hold relay contacts 256 in lead 259 to switchboard idle lamp 257 prevents the "circuit idle" lamp from lighting, and thereby prevents an operator from making a trunk connection to this trunk.

The arrangement of FIG. 4 serves to indicate to the TASI control circuit each trunk which is in actual use. It also provides the TASI control circuit with means for marking inactive trunk appearances as unavailable for use. In this way, the number of trunks having access to the TASI facilities can be controlled from the TASI control circuit.

Figure 5:
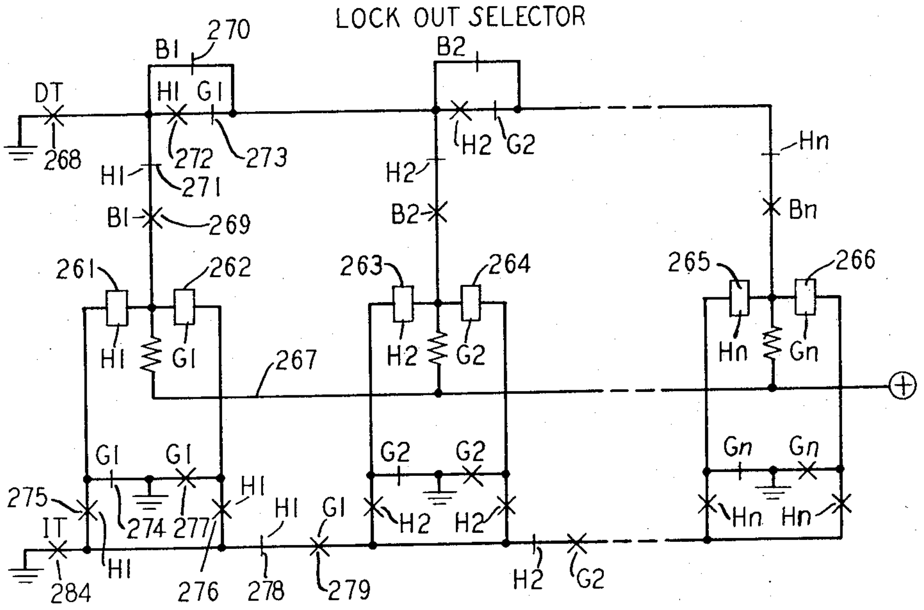
FIG. 5 is a detailed schematic diagram of an automatic trunk load control circuit which can be used in the circuit of FIG. 1.

Referring more particularly to FIG. 5, there is shown a schematic diagram of a lockout selector circuit which is used to selectively mark the trunk jack appearances at the toll switchboard as busy. The selector circuit of FIG. 5 comprises a plurality of H-relays 261, 263, 265 and G-relays 262, 264, 266. One H-relay and one G-relay are provided for each trunk appearance at the toll switchboard 10 in FIG. 1. In the illustrative embodiment, this number is assumed to be one hundred and twenty, although it may, in fact, be any number between two and four times the total number of transmission channels available on the transmission facilities 11 and 12. Each relay winding 261 to 266 is connected through a current limiting resistor to a positive voltage bus 267. The same terminal of each relay winding is connected to a switching matrix including contacts operated by itself and operated by a corresponding B-relay (such as B-relay 250 in FIG. 4) for releasing purposes.

Assuming first that DT relay 239 in FIG. 3 is operated in response to an excessively large freezeout condition, DT contacts 268 close to release H–1 relay 261 and G–1 relay 262 through the normally open contacts 269 of the B–1 relay and the normally closed contact 271 of H–1 relay 261. It will be noted that, if telephone trunk No. 1 is already in use, the B–1 relay will be operated by way of an arrangement similar to that shown in FIG. 4. Since it is desired to operate the hold relays for trunks carrying calls, to insure that when that call has terminated no new speech is allowed in, the B–1 relay must be operated to allow H–1 and G–1 to be controlled. If the B–1 relay is not operated, normally closed contact 270 will transfer control around relay windings 261 and 262. Instead H–2 and G–2 relays 263 and 264 will operate, provided, of course, that the corresponding B–2 relay contacts are operated. Againg, if the corresponding B–2 relay is not operated, control will be transferred to the next H-relay and G-relay in the chain, and this process continues until an H- and G-relay is encountered for which the corresponding B-relay is operated. Moreover, in order for an H- and G-relay pair to be controlled by a "decrease trunk" command, the trunk must be available, which requires that the H-relay be unoperated. Therefore the control must be passed through H–1 contact 271 in order for trunk 1 to be held. If the trunk is already held, contacts 272 and 273 will be operated, transferring control to the next relay pair 263 and 264.

Returning to $H_1$–$G_1$ relays 261 and 262, and assuming that B–1 contact 269 is operated and that trunk No. 1 is busy so the $H_1$ contact 271 is not operated, operation of the DT contact 268 will release G–1 relay 262 and keep H–1 relay 261 unoperated. When the "decrease trunk" pulse has finished and DT contact 268 is no longer operated, $G_1$ contact 274 will operate H–1 relay 261. The relays will then be in the "held" position, with H–1 relay 261 operated and G–1 relay 262 released. It should be noted that the use of two relays arranged in this manner insures that exactly one trunk will be made busy every time the DT contact 268 operates.

On all successive pulses following the first pulse, another H-relay and G-relay in FIG. 5 is controlled, causing the corresponding circuit to be held idle as shown in FIG. 4. This process continues until the freezeout fraction falls to the desired level, at which time DT relay 239 (FIG. 3) no longer receives pulses by way of gate 237. At this time, the switchboard idle lamps of several circuits carrying calls will have been disabled, insuring that when the call in progress has terminated a new call will not enter the TASI system on the trunk made busy, thus tending to reduce the freezeout fraction to the desired value.

At some later time, a number of talkers will cease to talk or hangup and the freezeout fraction will fall below the desired value. It will be advisable to take a trunk out of hold condition and put it in "available" state. To do this a pulse will be delivered by way of gate 236 to IT relay 238 (FIG. 3). At this time IT contact 284 operates, providing a ground path to G–1 relay 262 (assuming H–1 contacts 275 and 276 are already operated). At this time G–1 relay 262 will operate. When the IT pulse has passed and IT contact 284 is no longer operated, G–1 contact 277 will hold G–1 relay 262 operated and relay H–1 will release because G–1 contact 274 opens, and the relays will again be in the "available" state with G–1 relay 262 operated an H–1 relay 261 released. Alternatively, if the H–1 and G–1 relays are already in the "available" state, H–1 relay released and G–1 relay operated, when the IT contact is operated, H–1 and G–1 contacts 278 H–G relays in the held state in the chain are released for each operation, next relay pair 263 and 264. In this way, the first H–G relays in the held state in the chain are released for each operation of IT contacts 284 and are now in the available state. As with the DT operations, the use of two relays insures that only one trunk is released from the held state for each operation of IT contact 284. Successive operations of IT contact 284 serve to release successive ones of the trunks from the held state, thereby allowing the corresponding idle lamp to light. Connections may thereafter be made at the toll switchboard to these trunks, resulting in increased speech activity and an increased freezeout fraction, tending to bring the freezeout fraction back up to the value desired.

It can be seen that the circuits of FIGS. 3, 4 and 5, in combination, serve to maintain the freezeout fraction at the desired level by selectively marking the trunk appearances as busy and selectively removing these markings. A sufficient amount of averaging is provided by the integrating amplifiers 225 and 226 to provide a reasonable time constant. This arrangement, together with the arrangement which allows only a single H- and G-relay to operate at a time, prevents the control system from overcompensating an extreme condition and causing unwanted oscillations in the control function.

It may be noted that trunks are marked busy in the lockout selector circuit of FIG. 5 in a preselected sequence since lockout always begins with the lowest numbered trunk. For this reason, these low-numbered trunks will be locked out most frequently. In the higher numbered trunks, lockout will occur very infrequently, if at all. Higher priority services can therefore be assigned to the higher numbered trunks and the control circuit of the present invention will insure the maintenance of these priority ratings.

If on the other hand, such priorities are not desired, a different type of lockout selector may be devised in which the trunks to be locked out are selected at random. This could be accomplished, for example, by a scanning arrangement which selects the trunks to be locked out on the basis of the time at which the request for increasing or decreasing trunks is received. If the scanning is done at a sufficiently rapid rate, this time occurs more or less randomly within the scanning cycle.

It is to be understood that the above-described arrangements are merely illustrative of the numerous and varied other arrangements which may constitute applications of the principles of the invention. Such other arrangements may readily be devised by those skilled in the art without departing from the spirit or scope of this invention.

What is claimed is:

1. A control system in which a plurality of user facilities compete for the temporary use of a lesser plurality of service facilities on a random basis, said control system comprising, means for measuring the ratio of the number of user facilities requesting and not receiving service to the total number of user facilities requesting service, and means, responsive to deviations of said ratio from a preselected value, for adjusting the number of said user's facilities competing for said service facilities.

2. The control system according to claim 1 wherein said user's facilities comprise telephone trunks and said service facilities comprise transmission channels.

3. The control system according to claim 2 further including time assignment speech interpolation means for selectively connecting active ones of said telephone trunks to available ones of said transmission channels for at least the duration of the current activity.

4. The control system according to claim 1 wherein said measuring means comprises means for differentially combining signals proportional to said numbers, and means for determining the polarity and magnitude of said differential combination, said adjusting means increasing or decreasing said number of user facilities, depending on said polarity and at a rate proportional to said magnitude.

5. The control system according to claim 4 wherein said adjusting means includes means for changing said number of user facilities in incremental steps of one.

6. In a time assignment speech interpolation system wherein active ones of a plurality of talker lines are selectively connected to available ones of a lesser plurality of transmission channels on a time division basis, means for adjusting the ratio of said talker lines to said transmission channels in response to the quality of speech transmitted, said adjusting means comprising a freezeout monitor for measuring the ratio of the number of active talker lines not connected to transmission channels to the total number of active talker lines, and means responsive to said freezeout ratio for adjusting the number of said talker lines competing for said transmission channels so as to maintain said freezeout ratio at a preselected value.

7. The combination according to claim 6 wherein said freezeout monitor comprises means for deriving a signal proportional to said number of active but unconnected talkers, means for deriving signal proportional to said total number of active talkers, means for attenuating said signal proportional to said total number of active talkers by said preselected value, means for obtaining the difference between said attenuated signal and said signal proportional to said number of active but unconnected talkers, means for generating pulses at a rate proportional to said difference, means for applying said pulses to increase said number of talker lines when said difference is positive, and means for applying said pulses to decrease said number of talker lines when said difference is negative.

8. The combination according to claim 6 wherein said adjusting means comprises means for marking each talker line as busy when it is not to be used.

9. The combination according to claim 6 further including means for disabling said adjusting means in response to remote receiving end operation.

References Cited

UNITED STATES PATENTS

| | | | |
|---|---|---|---|
| 3,005,874 | 10/1961 | Jaeger | 179—15 |
| Re. 25,546 | 3/1964 | Saal | 179—15 |

RICHARD MURRAY, Primary Examiner

CARL R. VON HELLENS, Assistant Examiner

U.S. Cl. X.R.

178—50